(12) United States Patent
Kinast et al.

(10) Patent No.: US 10,650,033 B2
(45) Date of Patent: May 12, 2020

(54) CALENDAR USER INTERFACE SEARCH AND INTERACTIVITY FEATURES

(71) Applicant: Microsoft Technology Licensing, LLC, Redmond, WA (US)

(72) Inventors: Ruediger A Kinast, Seattle, WA (US); Rachel Sirkin, Seattle, WA (US); Christopher C Knestrick, Redmond, WA (US); Pankaj S Luthra, Seattle, WA (US); Thomas Christopher Laflin, Seattle, WA (US); Ashita Khetan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 15/617,827

(22) Filed: Jun. 8, 2017

(65) Prior Publication Data
US 2018/0357305 A1 Dec. 13, 2018

(51) Int. Cl.
*G06F 16/338* (2019.01)
*G06F 16/33* (2019.01)
(Continued)

(52) U.S. Cl.
CPC .......... *G06F 16/338* (2019.01); *G06F 16/334* (2019.01); *G06F 16/951* (2019.01);
(Continued)

(58) Field of Classification Search
CPC .... G06F 16/338; G06F 16/951; G06F 16/334; G06F 3/04845; G06F 3/0481; G06Q 10/109
See application file for complete search history.

(56) References Cited

U.S. PATENT DOCUMENTS 8,069,417 B2 * 11/2011 Brush ................ G06Q 10/1093
705/7.18
8,627,222 B2 1/2014 Hartwell et al.
(Continued)

OTHER PUBLICATIONS

"Searching, Finding, and Filtering Events", https://support.busymac.com/help/70611-searching-finding-and-filtering-events, Published on: 2007, 4 pages.
(Continued)

*Primary Examiner* — Tarek Chbouki
*Assistant Examiner* — Maher N Algibhah
(74) *Attorney, Agent, or Firm* — Schwegman Lundberg & Woessner, P.A.

(57) ABSTRACT

Systems and devices for presenting coordinated event search results in a user interface for a calendar are disclosed. In an example, operations include: generating a calendar surface user interface, to display at least one event in a calendar view; receiving a search query for a search of the calendar; generating a search result user interface, to display events from a result of the search query; and updating the calendar surface based on the search result, with the display of the events in the calendar surface being updated based on a match with the search query. As various examples, based on the search results or the search query: the search result portion may indicate that a corresponding event is displayed within the calendar surface portion; graphical emphasis effects may be applied to search results or events; or graphical de-emphasis effects may be applied to search results or events.

21 Claims, 10 Drawing Sheets

(51) Int. Cl.
    *G06Q 10/10*     (2012.01)
    *G06F 16/951*     (2019.01)
    *G06F 3/0484*     (2013.01)
    *G06F 3/0481*     (2013.01)

(52) U.S. Cl.
    CPC ......... *G06Q 10/109* (2013.01); *G06F 3/0481* (2013.01); *G06F 3/04845* (2013.01)

(56) References Cited

U.S. PATENT DOCUMENTS

| | | | |
|---|---|---|---|
| 9,225,820 B2 | 12/2015 | Stovicek et al. | |
| 2006/0190313 A1* | 8/2006 | Lu | G06Q 10/06311 705/7.19 |
| 2008/0133524 A1 | 6/2008 | Ryan et al. | |
| 2009/0174680 A1* | 7/2009 | Anzures | G06F 1/1626 345/173 |
| 2012/0240037 A1* | 9/2012 | Migos | G06F 3/0483 715/255 |
| 2013/0036369 A1* | 2/2013 | Mitchell | G06Q 50/00 715/753 |
| 2013/0124542 A1* | 5/2013 | Lee | G06F 17/30392 707/751 |
| 2014/0074815 A1* | 3/2014 | Plimton | G06F 17/30572 707/709 |
| 2014/0222857 A1* | 8/2014 | Chen | G06F 17/30864 707/769 |
| 2015/0199402 A1* | 7/2015 | Agrawal | G06Q 10/109 707/723 |
| 2015/0370904 A1* | 12/2015 | Joshi | G06F 3/04847 707/722 |
| 2016/0147403 A1 | 5/2016 | Koch et al. | |

OTHER PUBLICATIONS

"Mobile Friendly and Responsive Expanding Search Bar", http://jquery-plugins.net/mobile-friendly-and-responsive-expanding-search-bar, Published on: Jun. 26, 2013, 7 pages.

Joshi, Neel, "Discover Calendar Search in Outlook Web App", https://blogs.office.com/2014/03/13/discover-calendar-search-in-outlook-web-app/, Published on: Mar. 13, 2014, 7 pages.

"Google Suggest: Frequently Asked Questions", Retrieved From: http://web.archive.org/web/20060613122748/http://labs.google.com/suggestfaq.html, Jun. 13, 2006, 2 Pages.

"International Search Report and Written Opinion Issued in PCT Application No. PCT/US2018/031927", dated Jul. 11, 2018, 12 Pages.

* cited by examiner

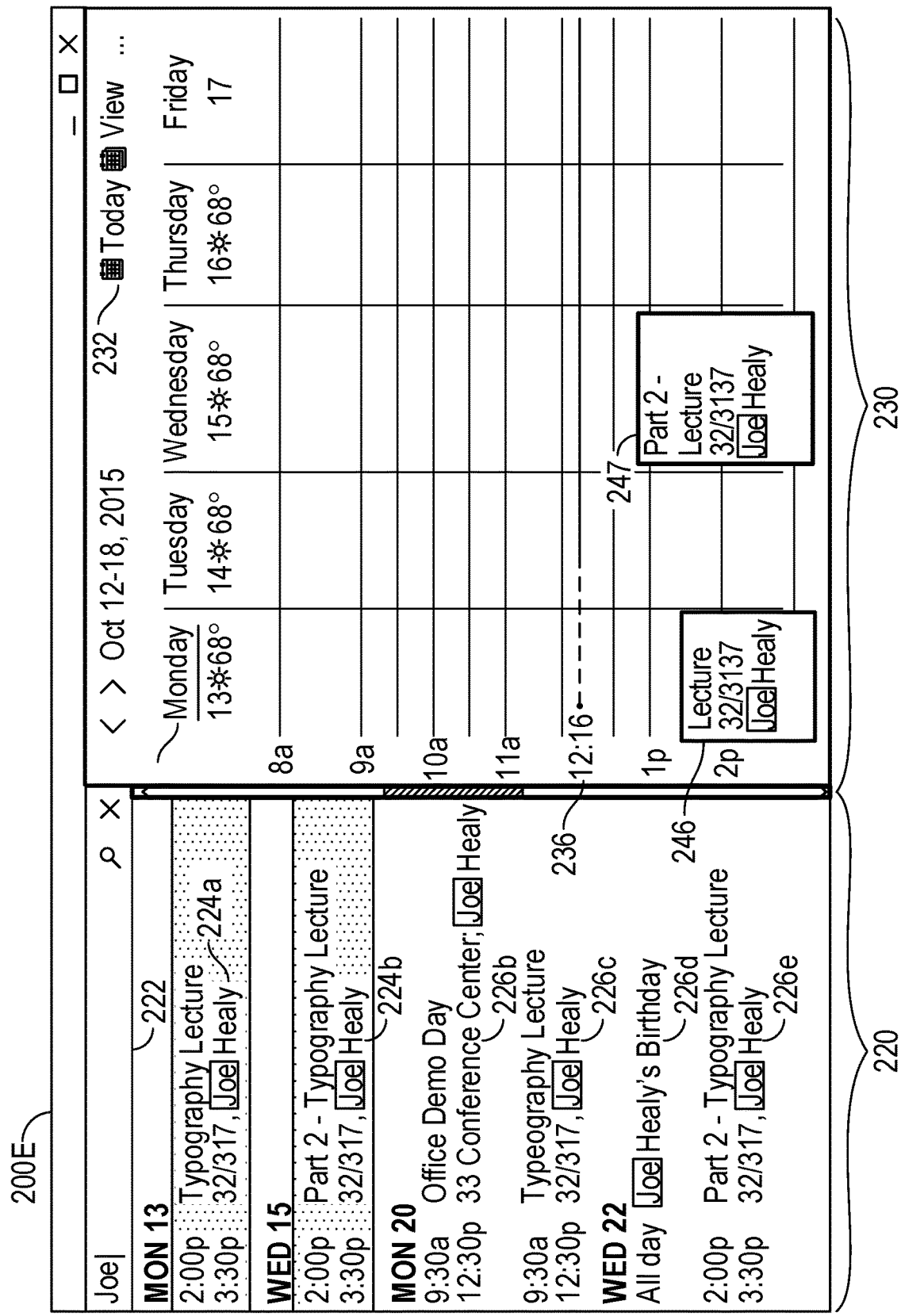

Joe|  🔍  ✕

MON 13 — 222
2:00p  Typography Lecture — 224
3:30p  32/317, [Joe] Healy

WED 15
2:00p  Part 2 - Typography Lecture
3:30p  32/317, [Joe] Healy — 226a

MON 20
9:30a  Office Demo Day
12:30p  33 Conference Center; [Joe] Healy — 226b 9:30a  Typography Lecture
12:30p  32/317, [Joe] Healy — 226c

WED 22
All day  [Joe] Healy's Birthday — 226d

2:00p  Part 2 - Typography Lecture
3:30p  32/317, [Joe] Healy — 226e

⎫
⎬ 220
⎭

— ☐ ✕
⌐┘ Pop out

Home — 254
💾 Save and close  🗑 Delete  ✓ ? ✕ ✉ 🔔 — 262

Details

Typography Lecture — 256

Monday, October 13, 2015, 2:00PM to 3:30 PM
32/3137

🔄 Every Monday, effective 9/23/2015 until
    12/16/2015 from 2:00 PM to 3:30 PM
    View Series This is a replacement to the typography
lecture series that Jeff set up.

[Joe] — 264

People — 258

[Invite Someone]

Sort by Original order ⌄

Ⓜ [Joe] Healy — 262
    jhealy@contoso.com

Ⓖ  Design Team
    uxdesign@contoso.com

⎫
⎬ 250
⎭

CALENDAR USER INTERFACE SEARCH AND INTERACTIVITY FEATURES

BACKGROUND

A wide variety of software applications such as office productivity applications, email clients, personal assistant programs, and the like include calendar and event scheduling features. Graphical user interfaces (GUIs) in these software applications are commonly presented to users to provide standardized views of calendars and calendar events. As a result, the usage of user-interactive calendar interfaces is widespread.

Many calendar GUIs are presented on small screen areas, due to software, hardware, or usability constraints, and thus many calendar GUIs provide limited views and listings of windows of dates and times of a calendar. Although some calendar GUIs include functionality for searching calendar entries, such as by search keywords, these search features are often incomplete or technically limited. Accordingly, existing functionality for searching calendar entries often relies on a user's personal knowledge of a particular event date or time to locate a past or future event on a calendar.

SUMMARY

Various details for the embodiments of the inventive subject matter are provided in the accompanying drawings and in the detailed description text below. It will be understood that the following section provides summarized examples of some of these embodiments.

Embodiments described herein generally relate to the execution and operation of software applications on computing systems and in particular, to the operation of information search functionality within a calendar graphical user interface (GUI) presented by a computing system. In an example, embodiments may include electronic operations to present coordinated search results in a calendar user interface including a calendar surface portion and a search result portion, with operations to: generate a calendar surface portion of the user interface, such that the calendar surface portion displays at least one event in a view of the calendar; receive a search query for a search of the calendar, such that a search result is obtained from the search of the calendar using the search query; generate a search result portion of the user interface, such that the search result portion displays at least one event from the search result; update the calendar surface portion of the user interface based on the search result, such that the display of the at least one event in the calendar surface portion is updated based on a match with the search query; and update the display of the at least one event from the search result, in the search result portion, to indicate that a corresponding event is being displayed within the calendar surface portion.

In a further example, the search result portion of the user interface is updated to change the display of the at least one event from the search result in response to user interaction with the calendar surface portion of the user interface, and the calendar surface portion of the user interface is updated to change the display of the at least one event in the view of the calendar in response to user interaction with the search result portion of the user interface.

Also in a further example, the search result portion is updated based on the corresponding event that is being displayed within the calendar surface portion, such that the search result portion: applies a graphical emphasis effect to at least one event from the search result that is visible in the calendar surface portion, and applies a graphical de-emphasis effect to at least one event from the search result that is not visible in the calendar surface portion.

Also in a further example, updating of the calendar surface portion includes applying a first graphical emphasis effect to the display of the at least one event in the calendar surface portion of the user interface, and applying a second graphical emphasis effect to at least one event from the search result that is visible in the calendar surface portion. For instance, the first and second graphical emphasis effect may be provided from at least one of: highlighting, an opacity setting, an increased font size, a designated pattern, or a designated color.

Also in a further example, updating of the calendar surface portion includes applying a first graphical de-emphasis effect to a display of at least one other event in the calendar surface portion of the user interface that does not correspond to the search result, and applying a second graphical de-emphasis effect to the at least one event from the search result that is not visible in the calendar surface portion. For instance, the first and second graphical de-emphasis effect may be provided from at least one of: highlighting, an opacity setting, an increased font size, a designated pattern, a designated color, or hiding of the respective event.

An embodiment discussed herein includes a computing device including processing hardware (e.g., a processor) and memory hardware (e.g., a storage device or volatile memory) including instructions embodied thereon, such that the instructions, which when executed by the processing hardware, cause the computing device to implement, perform, or coordinate the electronic operations. Another embodiment discussed herein includes a computer program product, such as may be embodied by a machine-readable medium or other storage device, which provides the instructions to implement, perform, or coordinate the electronic operations. Another embodiment discussed herein includes a method operable on processing hardware of the computing device, to implement, perform, or coordinate the electronic operations.

As discussed herein, the logic, commands, or instructions that implement aspects of the electronic operations described above, may be provided in a local computing system (e.g., via a standalone software application, or a client viewer, which provides a calendar interface) or a remote computing system (e.g., via a web server which provides data for a calendar interface), including any number of form factors for the computing system such as desktop or notebook personal computers, mobile devices such as tablets, netbooks, and smartphones, client terminals and server-hosted machine instances, and the like. Another embodiment discussed herein includes the incorporation of the calendar search and display techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 2A-2F illustrate graphical user interface layouts that provide features of calendar surface, search result, and event detail areas in a calendar graphical user interface, according to various examples.

DETAILED DESCRIPTION

In the following description, methods, configurations, and related apparatuses are disclosed for the deployment of calendar search functionality, including dynamically generated search result enhancements being presented on or next to a calendar surface user interface. These techniques include integration of user interface functionality to coordinate events viewed and actions conducted between a search results user interface and the calendar surface user interface. These techniques may be used, for example, by a software application that hosts and presents a calendar user interface having a large number of dates and events, to allow a robust list of search results to be discovered and surfaced across a large amount of time. Accordingly, the techniques discussed herein enable improved information retrieval operations and a reduced number of data transactions to identify, locate, and interact with particular calendar events (including appointments, tasks, reminders, and other entries).

The techniques and configurations described herein also enable the presentation of additional data fields and new forms of user interfaces, which expedite the review and presentation of search results and linked search result data. In an example, when a user is presented a set of calendar event search results from a keyword search of a calendar, the search results are indicated both in list form (e.g., in a list or summary that includes the various search results) and in context on the calendar surface (e.g., in the calendar grid), such as with matching search results being emphasized in full color or highlighting while other events are deemphasized. These two different views may be presented side-by-side with each other, such that interaction with one portion of the calendar user interface (e.g., a changed emphasis in the search results list) causes changes to the other portion of the calendar user interface (e.g., a selection in the calendar grid).

As discussed in the following examples, the calendar search presentation techniques may be hosted and generated from a variety of sources that provide calendar and search functionality, including in standalone software applications, mobile device applications (e.g., downloadable "apps" obtained from an app store), and web or browser-based applications. Thus, the techniques described herein may be applicable to many types of user-facing software hosting or presenting a calendar interface, such as office productivity software (e.g., email programs, word processors, spreadsheets, presentation, note taking applications), personal assistant programs (e.g., standalone calendar management applications), web browsers (e.g., executing web pages for online calendar management), enterprise software applications, and the like.

Figure 1:
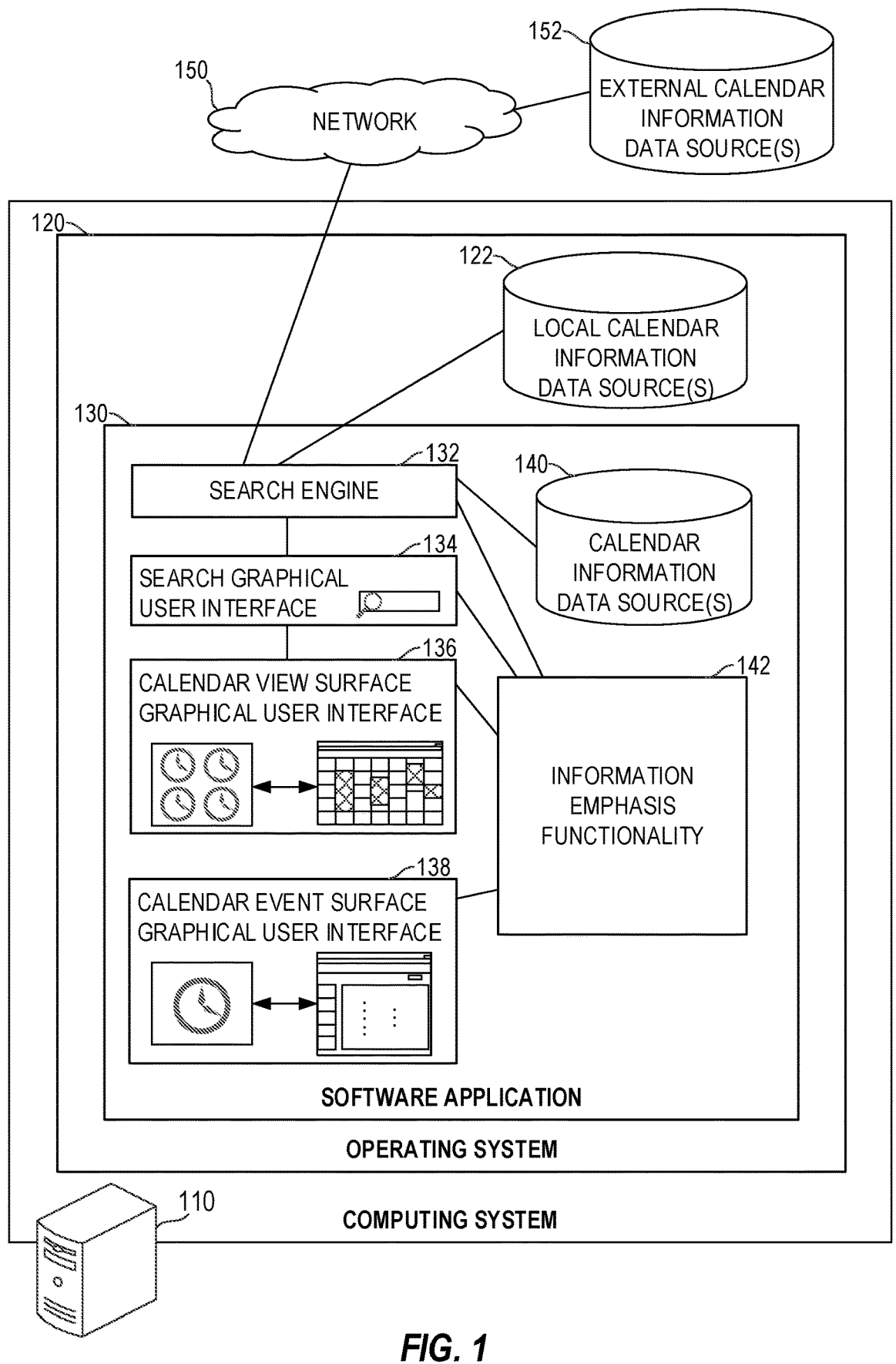
FIG. 1 illustrates a scenario of calendar search functionality provided in a software application of a computing system, according to an example.

FIG. 1 provides an overview of an example scenario of calendar search functionality provided in a software application 130 of a computing system 110. As shown, the software application 130 executes within an operating system 120 of the computing system 110, and provides a series of user interface features 134, 136, 138 as part of a calendar user interface further discussed below. As an example, the computing system 110 may be operated by a user or set of users (not shown) and generate a graphical output of the calendar and the user interface features 134, 136, 138 to the user(s) via a display device (not shown). Other hardware and functional components of the computing system 110 are not depicted for simplicity, but an example implementation of such hardware components and system functionality is further discussed below with reference to FIG. 5.

The software application 130 is depicted in FIG. 1 as including a search engine 132, with the search engine 132 operable to perform a search on one or more calendar information data sources 140 of the software application 130. For example, the calendar information data sources 140 may include a calendar that tracks a plurality of entries for respective calendar events. The calendar information data sources 140 may also be derived from other data sources (such as email messages, project information, event metadata, etc.) managed or accessed by the software application 130. The search engine 132 may locate calendar entries, events, and associated calendar information items based on alphanumeric keywords, date ranges, event categorizations or type, metadata, or like data items. In an example, the search engine 132 may identify search results from a single calendar or from among multiple calendars, including from among a user's personal calendar, shared calendars, group calendars, activity (e.g., sports or school) calendars, or other calendars operated or subscribed to by other persons or entities. In another example, such search functionality and the search engine may be external to the software component 130, such as with the use of a server-based search engine or service.

The search engine 132 is also depicted as being operably coupled to other data sources for information retrieval, such as one or more local calendar information data sources 122 provided by the operating system 120, and one or more external calendar information data sources 152 provided by a remote location and accessible via a network 150. For example, the local calendar information data sources 122 may include calendar information provided by an operating system user profile, calendar information generated from another application operating in the operating system, or a defined interface (e.g., an application programming interface (API)) for calendar information that is hosted or exposed by the operating system 120. Also for example, the external calendar information data sources 152 may include a remotely accessible data service hosted by a service provider. In some examples, the local calendar information data sources 122 or external calendar information data sources 152 may be provided by other software applications and services, including email services or personal assistant services maintained for the user, a group of users, an enterprise or business, or the like. In other examples, operating system data sources or external data sources are not utilized by the search engine 132 or the software application 130.

The information retrieved by the search engine 132 is accessed and surfaced in the software application 130 through use of a search GUI 134. In an example, the search GUI 134 may include an alphanumeric search box within a search window (e.g., a search interaction window) that is expanded or filled to present a list of search results for matching calendar entries or events. Also in an example, the search GUI 134 may include an audio input control (not depicted) to trigger the receipt of voice (e.g., spoken natural language) search terms or concepts. The search GUI 134 may also include other forms of user controls, such as selection fields, drop down fields, time or date selectors, including fields or interactive selectors that provide suggested or auto-completed criteria for user searches. The search window and the alphanumeric search box may be positioned in a variety of locations in the calendar user interface, some examples of which are provided in FIGS. 2A-2F. In further examples, the search query functionality may include the presentation or use of historical search queries, auto-filled or suggested search queries, auto-completed search keywords or phrases, and similar dynamic functionality for keyword and search criteria inputs.

The software application 130 further includes a calendar view surface GUI 136, to provide a surface view of a calendar and to receive user interaction with respective representations of a calendar and calendar events. In an example, the calendar view surface GUI 136 includes a display of a calendar grid, organized by time and date, such as in a monthly, weekly, daily, or hourly grid (of one or more columns, or one or more rows), including variations of the above (e.g., displaying a calendar grid of weekdays across two weeks, or displaying business hours across three days, etc.) It will be understood that a grid provided by the calendar view surface GUI 136 may take a variety of forms. Some of the grid views available via the calendar view surface GUI 136 are provided in various examples in FIGS. 2A-2E.

The software application 130 further includes a calendar event surface GUI 138, used to select and display details of a particular calendar event or calendar entry. For example, details on a particular event or series of events scheduled at a particular date or time, and any accompanying notes, documents, files, may be viewed in detail in the calendar event surface GUI 138. An example view available via the calendar event surface GUI 138 is provided in FIG. 2F.

The software application 130 further includes information emphasis functionality 142 used with the calendar searching and display techniques discussed herein. This information emphasis functionality 142 may be used to coordinate the results of an event or information search identified by the search engine 132, as displayed with various types of emphasis or de-emphasis within the search GUI 134. Further to the examples provided in FIGS. 2A-2F, the information emphasis functionality 142 may operate with the calendar view surface GUI 136 and the calendar event surface GUI 138 to display information in the calendar view surface or the calendar event surface with graphical emphasis or de-emphasis on specific words or objects. As an example, such emphasis may include highlighting alphanumeric text from the search. As another example, such emphasis may include highlighting calendar entries on a grid or designating certain colors, shading, opacity, or font sizes on respective calendar entries on a grid or on a list of events. Corresponding de-emphasis may include shading or graying-out entries on a grid or designating certain colors, shading, or translucent properties on respective calendar entries on a grid or on a list of events.

FIGS. 2A-2F illustrate GUI layouts that provide features of calendar surface, search result, and event detail areas in a calendar GUI, according to various examples. For instance, FIGS. 2A-2F are shown as being embodied by a series of graphical screens of an email productivity software application (e.g., Microsoft Outlook®), which contains a calendar view to send, receive, and manage events among users within one or more calendars (e.g., a synchronized calendar maintained by a Microsoft Exchange® server). It will be understood that the following graphical features may also be embodied in web clients, standalone calendar programs, and with other forms of calendars (such as project management or organizational calendars).

FIGS. 2A-2F more specifically depict respective GUI layouts 200A, 200B, 200C, 200D, 200E, 200F configured for searching and viewing events in a calendar. The layout 200A in FIG. 2A includes a navigation portion 210 allowing navigation and selection of respective calendars, calendar views, and calendar dates; the layouts 200A-200F in FIGS. 2A-2F include a search portion 220 allowing entry and navigation among one or more search results for a search of the calendar; the layouts 200A-200E in FIGS. 2A-2E include a calendar surface portion 230 allowing navigation, selection, and review of calendar entries with a portrayed view of a calendar (e.g., via a day-by-day view of a weekly calendar presented in a calendar grid); and the layout 200F in FIG. 2F includes a calendar event portion 250 in place of a calendar surface portion, with the calendar event portion 250 providing a detailed view of information for a particular selected event or calendar item.

Figure 2A:
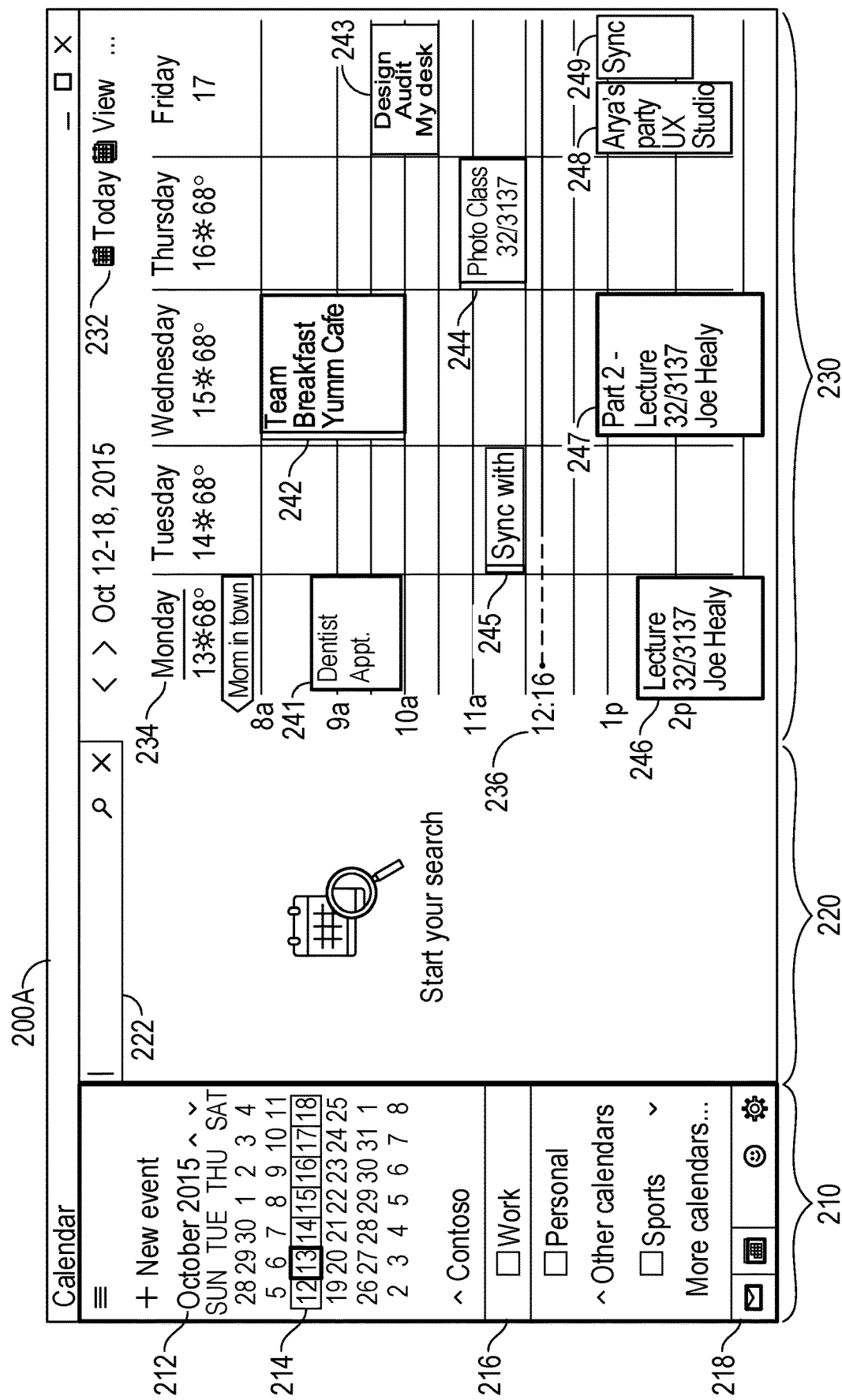

The navigation portion 210 depicted in FIG. 2A includes a date/time range selector 212 used to navigate to a particular month or time range, a calendar surface view selector 214 used to navigate to a particular selected day or time range (e.g., business work week) for display in the calendar surface portion 230, a calendar selector 216 used to navigate to a particular calendar (e.g., from among a plurality of available calendars), and a functionality selector 218 used to navigate among functional features of the software application (e.g., from among mail or calendar functionality, among other features). The navigation portion 210 is hidden in FIGS. 2B-2F for simplicity, but it will be understood that the navigation portion 210 may be visible or integrated as part of a GUI provided for any of the layouts 200B-200F.

The layout 200A of FIG. 2A depicts the search portion 220 as including an alphanumeric text entry box 222 to receive a text search query to search a calendar. The layout 200A also includes a grid-based calendar surface in the calendar surface portion 230, depicting a time window of a plurality of days arranged among a grid 234. The calendar surface portion 230 also depicts a time indicator 236 used to indicate a current time within the calendar, and a view selector 232 allowing selection of one of a plurality of views (such as allowing selection from among available views for "today", "this week", "next week", "this month", etc.). The calendar surface portion 230 also depicts a plurality of calendar entries 241-249, indicated with various forms of colors and patterns, such as to designate or differentiate accepted/unaccepted/tentative/optional events, categories or types of events, recurring events, and the like. Any number of display techniques and features may be used to provide a contrast or identification among different calendar events depicted within the grid 234 and the calendar surface portion 230.

Figure 2B:
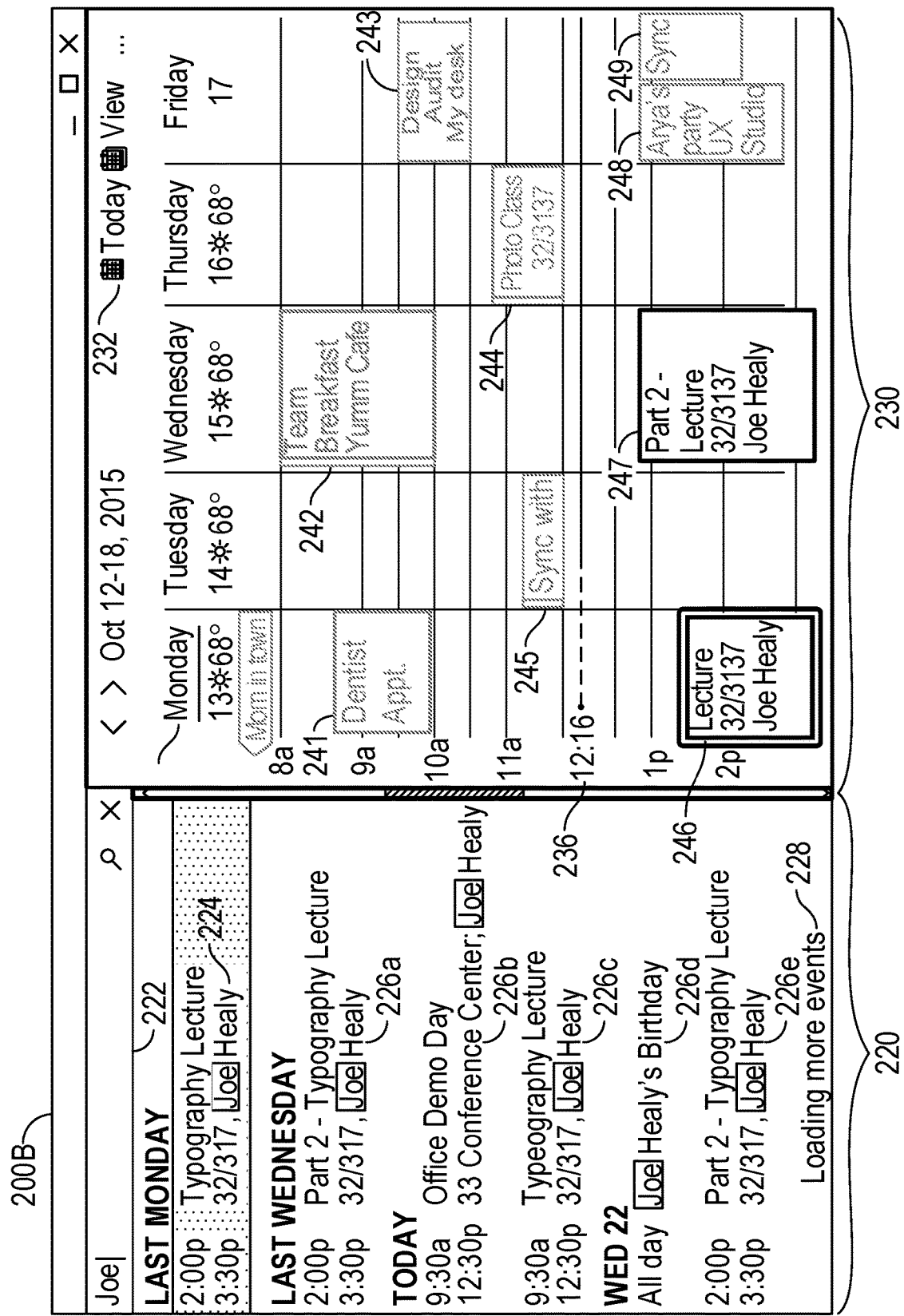

FIG. 2B depicts an example of a user interface with emphasized events in a calendar surface, a coordination of the emphasized events to a search result, and the emphasis of a search query in the search result. The layout 200B of FIG. 2B specifically depicts the search portion 220 as including the result of a calendar search, performed in response to entry of alphanumeric text ("Joe") as a search query in the alphanumeric text entry box 222. The search portion 220 includes events from a search result, listing a number of events 224, 226A, 226B, 226C, 226D, 226E. Within the events 224, 226A, 226B, 226C, 226D, 226E, text is highlighted to indicate matches with the search query (e.g., matches with the search term "Joe"). The search portion 220 also indicates that event 224 is selected, and as a result of the selection of event 224, the corresponding event 246 is emphasized (outlined, in this example) in the calendar surface portion 230. Additionally, the search portion 220 includes an event loading indicator 228 (e.g., "loading more events") at the bottom of the search portion visibility, such as to indicate loading of additional future events. In an example, the placement of the event loading indicator 228 may be provided at the top of the search portion visibility, such as to indicate loading of additional past events. In a further example, the event loading indicator 228 may include text or graphical indicators that indicate loading of search result(s) from specific calendars, accounts, sources, time ranges, or the like. Other types and forms of emphasis and de-emphasis graphical effects may be combined with such indicators.

The layout 200B of FIG. 2B also depicts the calendar surface portion 230 as including the plurality of calendar entries 241-249 previously included on the layout 200A. However, in the layout 200B, events that are included in the search result are depicted in the calendar surface portion 230 with an emphasis graphical effect, whereas events that are not included in the search result are depicted in the calendar surface portion 230 with a de-emphasis graphical effect. As shown, the emphasis graphical effect is to present events 246, 247 with opacity (or, full color); whereas the de-emphasis graphical effect is to present calendar events 241-245 and 248-249 with increased transparency (to allow these calendar events to appear more "grayed-out").

Figure 2C:
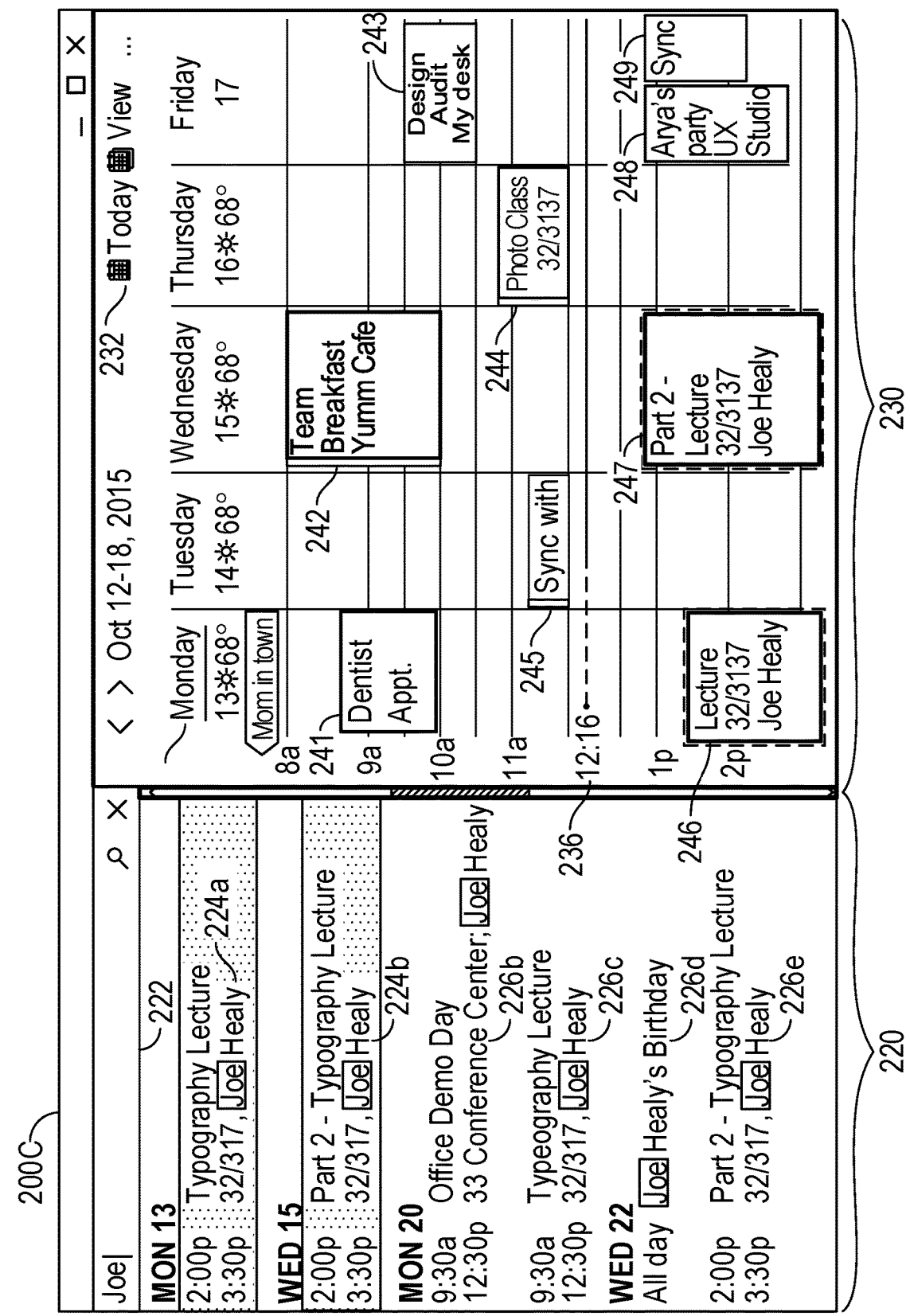

FIG. 2C depicts an example of a user interface with calendar events of a search result emphasized in a calendar surface, and coordination of visible calendar events to search result events. The layout 200C of FIG. 2C specifically depicts the search portion 220 as including a result of a search, performed in response to entry of alphanumeric text ("Joe") as a search query in the alphanumeric text entry box 222. The search portion 220 further includes a number of search result events, including events 224A, 224B, 226A, 226B, 226C, 226D, 226E, 226F. The search portion 220 includes an emphasis graphical effect (shading) for events 224A, 224B that correspond to calendar events visible within the calendar surface portion 230.

The layout 200C of FIG. 2C also depicts the calendar surface portion 230 as including the plurality of calendar entries 241-247 previously included on the layout 200A. However, in the layout 200C, events that are included in the search result are depicted in the calendar surface portion 230 with an emphasis graphical effect, through the use of a highlighted shading or color (e.g., yellow, red, etc.) around the respective events 246, 247 (corresponding to events 224A, 224B). In the layout 200C, events that are not included in the search result are depicted with no de-emphasis or emphasis effect.

Figure 2D:
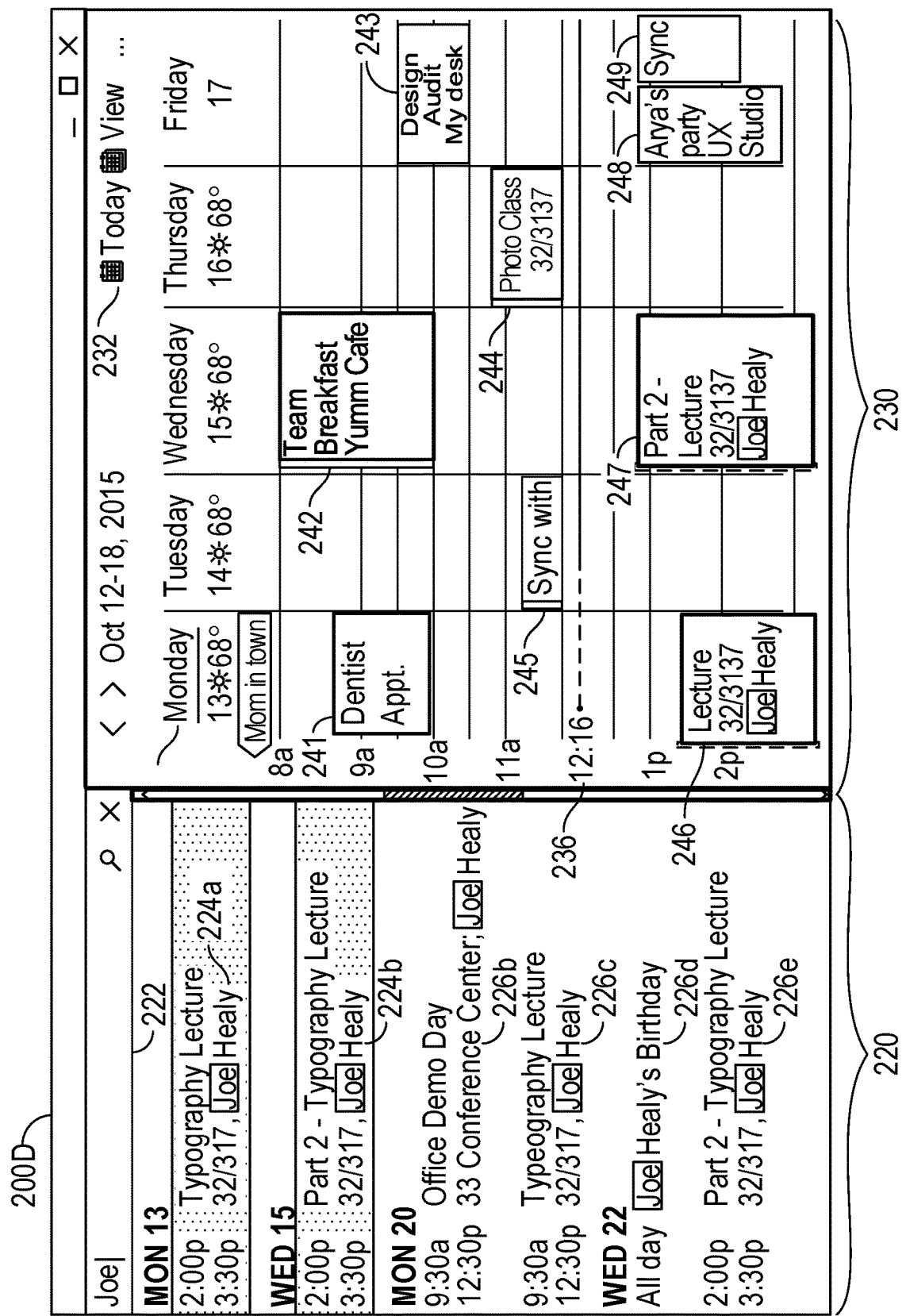

FIG. 2D depicts an example of a user interface with calendar events of a search result emphasized in a calendar surface, coordination of visible calendar entries to emphasized search result events, and emphasis of a search query within the visible calendar entries. In a similar fashion to FIG. 2C, the layout 200D of FIG. 2D depicts the search portion 220 as including a result of a search, performed in response to entry of alphanumeric text ("Joe") as a search query in the alphanumeric text entry box 222; the search portion 220 further includes a number of search result events, including events 224A, 224B, 226A, 226B, 226C, 226D, 226E; and the search portion 220 indicates that calendar events that correspond to events 224A, 224B which are visible within the calendar surface portion 230. In the calendar surface portion 230, however, specific characteristics of a depicted event that match the search query are emphasized. This is illustrated in events 246, 247, which include emphasis of the event (e.g., highlighting on a side of the calendar grid box for events 246, 247) in addition to emphasis on the event text corresponding to the search query (e.g., highlighting of text located on the calendar grid box for events 246, 247). Thus, in addition to highlighting the event as being located by the search query, the representation of the events 246, 247 may also indicate how the particular event matches the search query (e.g., from matching text, matching date or time characteristics, etc.)

FIG. 2E depicts an example of a user interface with calendar events of a search result emphasized in a calendar surface, coordination of visible calendar entries to emphasized search result events, and de-emphasis of calendar entries not matching the search query by removal (hiding) of the calendar entries. Specifically, as shown in layout 200E, only events 246, 247 that correspond to events 224A, 224B are shown (visible) in the calendar surface portion 230; all other calendar events previously depicted in the layout 200D are removed from presentation in the layout 200E. In the search result portion, the events 224A, 224B that correspond to the events 246, 247 which are visible in the calendar surface portion 230, may be presented with a different color or shading than used for the other search result events 226A-226E. The other search result events 226A-226E are not represented in the calendar surface portion 230, and are not emphasized in the search portion 220.

FIG. 2F depicts an example of a user interface with emphasized event details in a calendar surface, coordination of search result events with a particular event, and emphasis of search query information within the visible event details. As shown in layout 200F, the calendar grid surface has been replaced with a calendar event portion 250, providing event information 256. The event information 256 is accompanied by event participant information 258, along with viewing controls and operational controls 254 for changing or modifying the calendar event. As also shown in layout 200F, the result of the search (e.g., for "Joe" entered in the alphanumeric text entry box 222) corresponds to emphasis graphical effects provided on the event information 256 (in the form of highlighted text 264) and on the event participant information 258 (in the form of highlighted text 262). Thus, even with the viewing of the calendar event portion 250, the contextual information of the search can be maintained and presented within the user interface.

Figure 3:
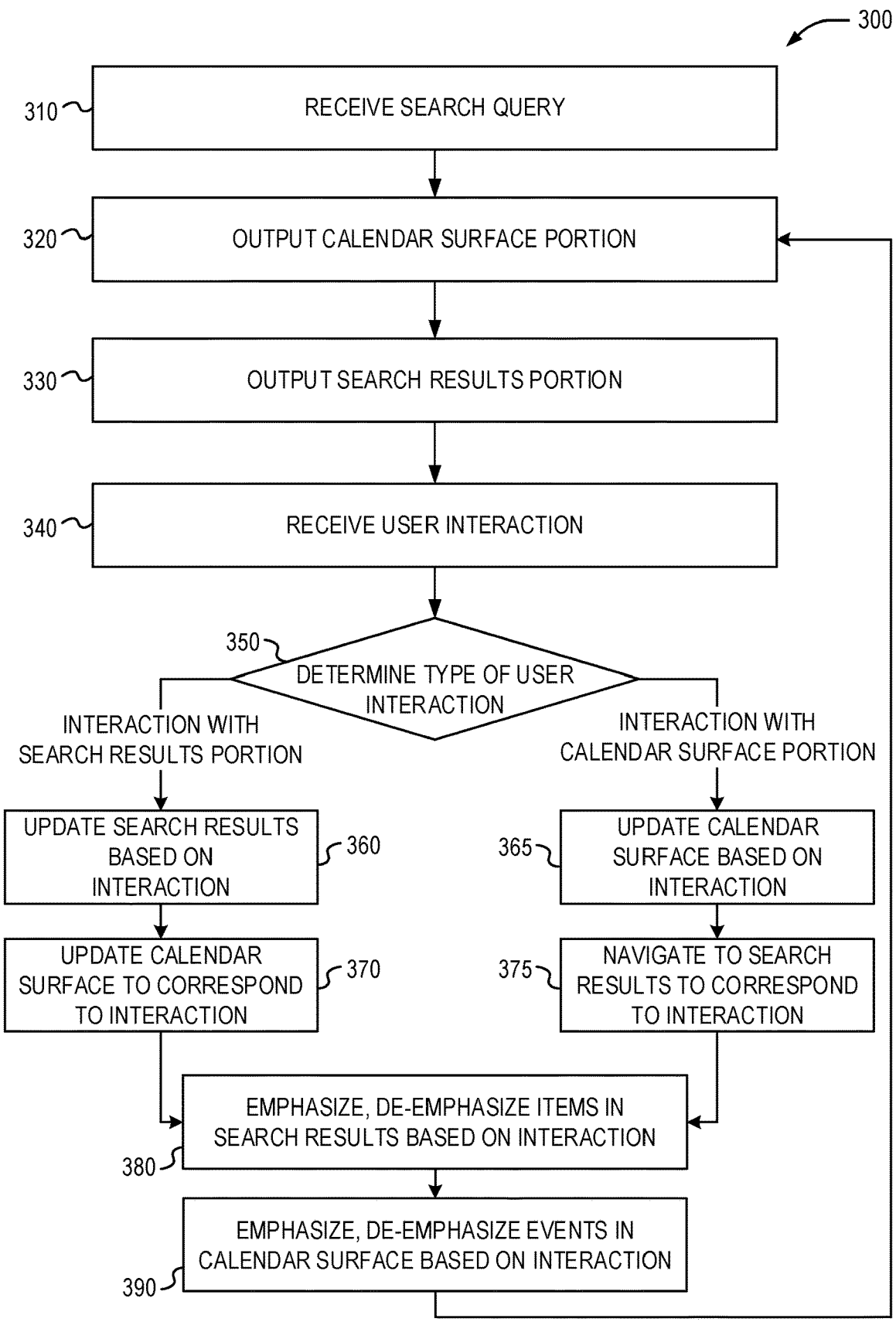
FIG. 3 illustrates a flowchart of operations for updating calendar search data based on user interaction in a calendar user interface, according to an example.

FIG. 3 illustrates a flowchart 300 of example operations for updating calendar search data based on user interaction in a calendar user interface. The operations depicted in the flowchart 300 are depicted from the perspective of a software application on a local machine that includes a user interface for outputting and receiving interaction with aspects of the search and calendar features discussed herein. However, it will be understood that the following operations may be applied through the use of server- or remotely-coordinated actions, such as in settings where the following interactions are performed with use of a server-generated user interface (e.g., via a dynamic calendar website).

As shown, the operations of flowchart 300 begin with the receipt of a search query (operation 310), such as may be provided through the entry or selection of text or other interactive objects in a user interface (e.g., a search box). In response to the search, the user interface operates to output the calendar surface portion of the user interface (e.g., a calendar grid that matches the search query or other search criteria) (operation 320), and output the search result portion of the user interface (e.g., a list of one or more search results, providing a summary of calendar events that matches the search query or other search criteria) (operation 330).

Based on the output of the calendar surface portion and the search result portion, further operations include the receipt of user interaction in the calendar surface portion or the search result portion of the user interface (operation 340). The type and location of the user interaction is evaluated (operation 350), and further operations are performed based on the type of user interaction, and whether the user interaction occurred in the calendar surface portion or the search result portion. In the case that the user interaction (e.g., selection, de-selection, navigation, etc.) occurred with the search result portion of the user interface, operations are performed to update the search result based on the interaction (operation 360), and update the calendar surface portion to correspond to the interaction in the search result portion (operation 370). In the case that the user interaction (e.g., selection, de-selection, navigation, etc.) occurred with the calendar surface portion of the user interface, operations may be performed to update the calendar surface based on the interaction (e.g., change the viewable items or time/date range in the calendar grid) (operation 365), and navigate to other search results in the search result portion that correspond to the interaction (operation 375). In some examples, there is a dependency to allow interaction between the search result list and the calendar surface in both directions. In other examples, the user interaction may only update the calendar surface based on the interaction, without updating of the search result portion (thus, not performing operations 365, 375).

In response to either type of interaction, items may be emphasized or de-emphasized in the search result based on the interaction (operation 380), and emphasized or de-emphasized in the calendar surface based on the interaction (operation 390). The emphasis graphical effects or de-emphasis graphical effects may include any of the effects discussed or illustrated herein Finally, in response to the updates (operations 360-375) and the emphasis or de-emphasis graphical effects (operations 380-390), the calendar surface portion and search result portion are again output to the user for interaction (operations 320-330). In particular, the use of emphasis and de-emphasis graphical effects may allow the user to observe the search results in context in a given timeframe, in a way that may not be achievable or practical in a conventional search result list view.

Figure 4:
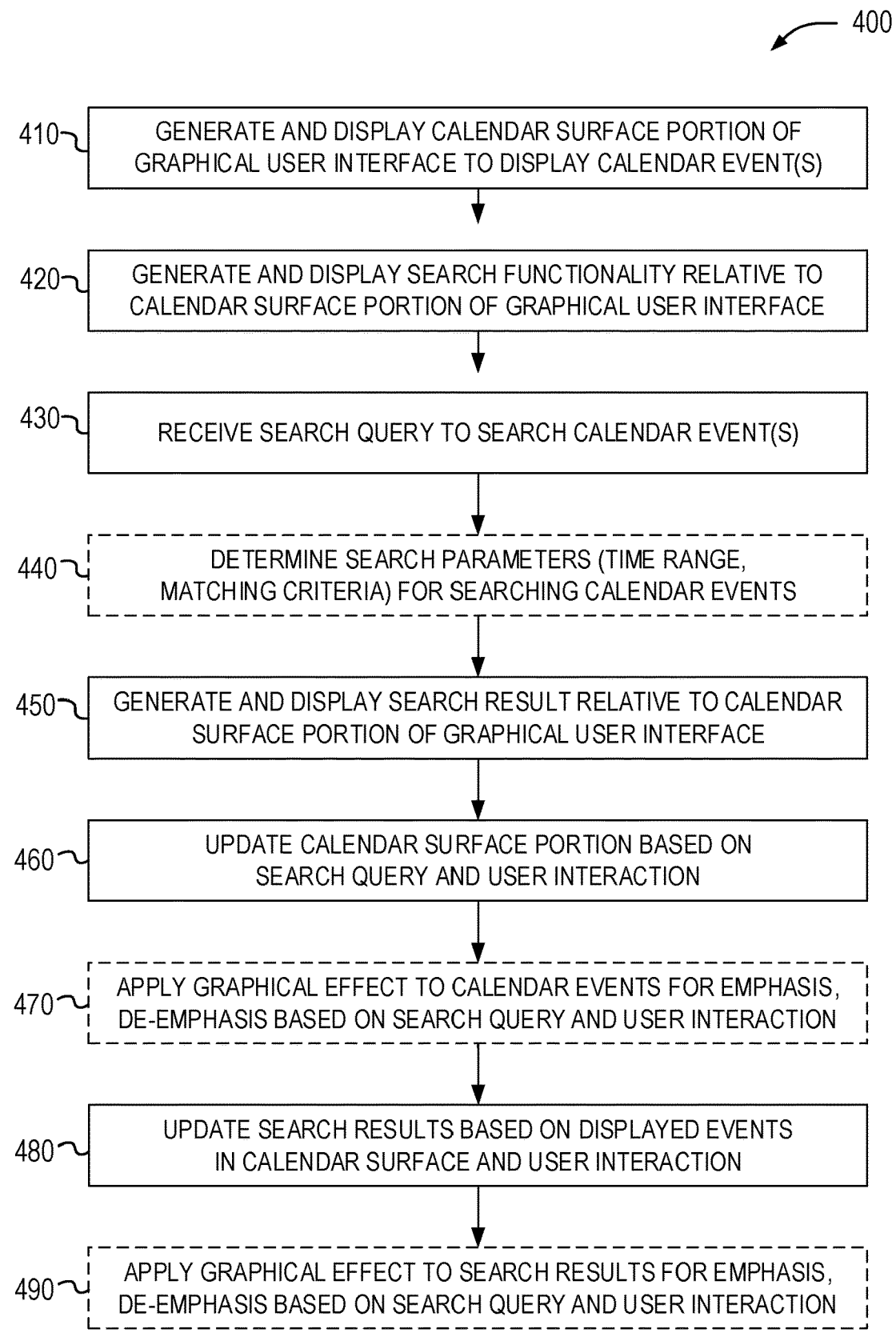
FIG. 4 illustrates a flowchart of operations for presenting coordinated search results in a calendar user interface, according to an example.

FIG. 4 illustrates a flowchart 400 of example operations for presenting coordinated search results in a calendar user interface. The actions implemented from the operations of the flowchart 400 may include the following sequence, although it will be evident that other variations to the order of the sequence may be provided.

First, the flowchart 400 begins with the generation and display of a calendar surface portion of a GUI (operation 410), to display one or more events of a calendar in a user-interactive software application. In an example, the calendar surface portion provides a view of the calendar, in the format of a calendar grid customizable from among a plurality of available calendar grids. For instance, the plurality of available calendar grids may depict monthly, weekly, or daily views. Additionally, the flowchart 400 also begins with the generation and display of search functionality (e.g., a search box, search screen, etc.) in a search portion presented relative to the calendar surface portion of the GUI (operation 420). In an example, the GUI is provided within a messaging software application, a web application of a browser application, a project management application, or a standalone calendar management software application. The GUI may include the search and calendar grid layouts depicted in FIGS. 2A-2F, although other layouts and variations may be utilized based on processing, bandwidth, screen size, device type, or software functionality constraints.

The operations of the flowchart continue with the receipt of a search query for a search of the calendar (operation 430), with the search of the calendar to be performed using the search query. In an example, the search query is initiated from an alphanumeric text query received in a search input box, from a search input box that also visible and is located in proximity to the search result portion of the calendar interface. The flowchart 400 further includes an optional operation to determine one or more search parameters, such as a time range, matching criteria, filtering, and the like, for searching the events of the calendar (operation 440). The time range for the search query may be manually specified by a user, suggested by a setting, or automatically determined. In an example, a customized time range may be automatically determined for the search query, based on at least one of: a type of event indicated in the search result, a total number of results indicated in the search result, or a user preference for searching prior events. In other examples, one or more of the search parameters for searching the events of the calendar may be supplied or designated by a user, an administrator, group settings, or the like. As a further example, the type of search results and date range may be based on identified matching characteristics of events or calendar items, allowing dynamic definition of time ranges based on the types of events or items (e.g., showing search results for all events that occur only once a year; while displaying only a week or month of results for a recurring daily activity).

The operations of the flowchart 400 continue with the generation and display of a search result, in a location (a search result portion) that is visible and is located in proximity to the calendar surface portion of the user interface (operation 450). The calendar surface portion and the display of the at least one event in the view of the calendar is then updated, in response to the search query and any user interaction with the search result portion of the user interface (operation 460). In an optional operation, one or more graphical effects (e.g., de-emphasis or emphasis graphical effects) may be applied to one or more calendar events in the calendar surface portion, based on the search query, user interaction, or the display of information in the search result of the user interface (operation 470). For instance, the graphical emphasis effect may be provided to the display of the at least one event in a calendar grid, from at least one of: highlighting, an opacity setting, an increased font size, animation, a first designated pattern, or a first designated color; a similar graphical de-emphasis effect may be provided to the display of the at least one event in a calendar grid from at least one of: a shading, a translucent setting, a decreased font size, lack of animation, a second designated pattern, or a second designated color. In a further example, the update to the calendar surface portion includes hiding of at least one calendar entry in a calendar grid, such that hiding is performed for the at least one calendar entry that does not correspond to the search result.

The operations of the flowchart 400 conclude with the updating of search result(s) in the search result portion, based on displayed events in the calendar surface and user interaction with the calendar surface or the search result portion (operation 480). In an example, events provided in a search result portion of the user interface are updated with emphasis or de-emphasis, based on the search query, user interaction, or the display of information in the calendar search portion of the user interface (operation 490). For instance, the graphical emphasis effect may be provided from at least one of: highlighting, an opacity setting, an increased font size, a first designated pattern, or a first designated color; and the graphical de-emphasis effect may be provided from at least one of: a shading, a translucent setting, a decreased font size, a second designated pattern, a second designated color, or hiding of at least one event.

In a further example, additional operations are conducted based on user interaction with either the calendar surface (operation 460) or the search portion (operation 480). This may include updating the search result portion of the user interface, to change the display of the at least one event from the search result, as a result of user interaction with the calendar surface portion of the user interface; or updating the calendar surface portion of the user interface, to change the display of the at least one event in the view of the calendar, as a result of user interaction with the search result portion of the user interface. In a further example, the updating may also include synchronized scrolling or visible views that are maintained between the calendar surface portion and the search result portion (e.g., as the search result portion scrolls to a different week or month, the calendar surface portion automatically scrolls, snaps, or changes the visible events to correspond to the search results).

Figure 5:
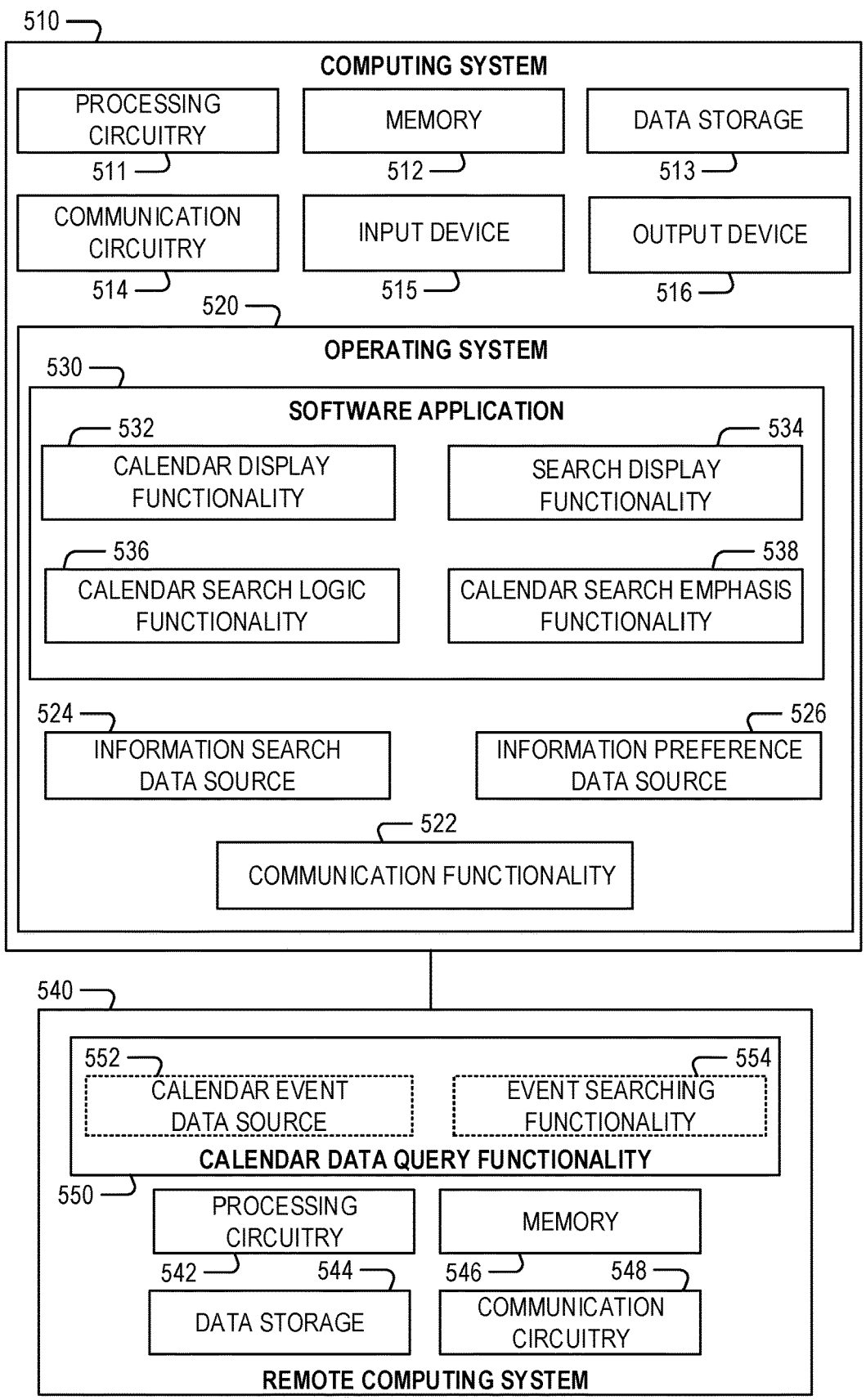
FIG. 5 illustrates a block diagram of hardware and functional components of a computing system to implement operations for generating, presenting, and updating coordinated search results in a calendar user interface of a software application, according to an example

FIG. 5 illustrates a block diagram of hardware and functional components of an example computing system 510 to implement interaction and display operations in a calendar user interface, such as are accomplished with the examples described above. The example operations of the flowcharts 300, 400, for example, may be performed at or among a local (e.g., client) or remote (e.g., server) computing device, or distributed components of such devices. In an example, the software application embodying the calendar user interface is adapted to execute only on a single computing device (e.g., computing system 510) with use of a processor and a memory device, to perform electronic operations as discussed herein. In a further example, the software application is adapted to perform some electronic operations on a local computing device (e.g., computing system 510), with additional search query and search processing performed at a remote computing device (e.g., remote computing system 540).

FIG. 5 more specifically illustrates selected hardware and functional components of the computing system 510 and the remote computing system 540 to implement operations for presenting coordinated event search results in a calendar user interface. It will be understood, that although certain hardware and functional components are depicted in FIG. 5 and in other drawings as separate systems or services, the features for certain of the components may be integrated into a single service or subsystem. Further, although only one local computing system and one remote computing system are illustrated, it will be understood that the features of these systems may be distributed in some settings among one or multiple computing systems (including in cloud-based or software-as-a-service (SaaS) processing settings).

As shown, the computing system 510 includes processing circuitry 511 (e.g., a CPU) and a memory 512 (e.g., volatile or non-volatile memory) used to perform electronic operations for executing presentation, search, and operation functionality (among other features) of an operating system 520 and a subject software application 530, and coordinating data operations among the presentation, search, and operational activities in a calendar user interface (e.g., to implement the techniques depicted in FIGS. 1-4), specifically through the execution of instructions for an operating system 520 and a subject software application 530; data storage 513 to store commands, instructions, and other data for operation and execution of the operating system 520 and the subject software application 530; communication circuitry 514 to communicate with an external network or devices (e.g., the remote computing system) via wired or wireless networking components for operation of the operating system 520 or the subject software application 530; an input device 515 (e.g., an alphanumeric, point-based, tactile, audio input device) to receive input (e.g., control commands) from a human user for the operating system 520 or the subject software application 530; and an output device 516 (e.g., visual, acoustic, haptic output device) to provide output (e.g., visual, acoustic, haptic output) to the human user from the operating system 520 or the subject software application 530.

In an example, the computing system 510 and the operating system 520 is adapted to execute the subject software application 530, and implement coordinated event search results in a user interface for a calendar through processing components or functionality (e.g., circuitry or software instructions), such as through: calendar display functionality 532 used to operate, update, and present a calendar surface and calendar event views of a user interface within the subject software application 530; search display functionality 534 used to obtain, update, and present search results within the subject software application; calendar search logic functionality 536 used to perform and implement search queries of data from or within the subject software application 530; and calendar search emphasis functionality 538 used to emphasize calendar events, search queries, or other calendar data within the subject software application 530.

In an example, the operating system 520 is adapted to include further processing functionality for coordinating calendar operations with the subject software application 530, through respective features including: communication functionality 522 (e.g., circuitry or software instructions) used to process data communications among the subject software application 530 and the remote computing system 540; an information search data source 524 (e.g., a database or data store) used to store and provide information for calendars or like metadata from other data sources of the computing system 510, the operating system 520, or other software applications (not shown); and an information preference data source 526 (e.g., a database or data store) used to store and provide information for user preferences (e.g., policies, settings, specifications) for accessing and utilizing calendar data of the subject software application 530. In a further example, the communication functionality may perform communications with the remote computing system 540 to perform calendar data queries as follows.

As shown, the remote computing system 540 includes processing circuitry 542 (e.g., a CPU) and a memory 546 (e.g., volatile or non-volatile memory) used to perform electronic operations (e.g., via instructions) for execution of remote queries, such as calendar data query functionality 550; data storage 544 to store commands, instructions, and other data for operation and use of the calendar data query functionality 550; and communication circuitry 548 to communicate with an external network or devices via wired or wireless networking components for communicating results from the calendar data query functionality 550 . In an example, the remote computing system 540 is adapted to coordinate a request from the subject software application 530, with the use of event searching functionality 554 on a calendar event data source 552. Other aspects of remote searching, data retrieval, and data processing may be performed by the remote computing system 540 to implement the techniques discussed herein in a network or multi-computer environment.

As referenced above, the embodiments of the presently described electronic operations may be provided in machine or device (e.g., apparatus), method (e.g., process), or computer- or machine-readable medium (e.g., article of manufacture or apparatus) forms. For example, embodiments may be implemented as instructions stored on a machine-readable storage medium, which may be read and executed by a processor to perform the operations described herein. A machine-readable medium may include any non-transitory mechanism for storing information in a form readable by a machine (e.g., a computer). A machine-readable medium may include a single medium or multiple media (e.g., a centralized or distributed database, and/or associated caches and servers) that store the one or more instructions.

A machine-readable medium may include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. A machine-readable medium shall be understood to include, but not be limited to, solid-state memories, optical and magnetic media, and other forms of storage devices. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and optical disks. The instructions may further be transmitted or received over a communications network using a transmission medium (e.g., via a network interface device utilizing any one of a number of transfer protocols.

Although the present examples refer to various forms of cloud services and infrastructure service networks, it will be understood that may respective services, systems, and devices may be communicatively coupled via various types of communication networks. Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A, or other personal area, local area, or wide area networks).

Embodiments used to facilitate and perform the electronic operations described herein may be implemented in one or a combination of hardware, firmware, and software. The functional units or capabilities described in this specification may have been referred to or labeled as components, processing functions, or modules, in order to more particularly emphasize their implementation independence. Such components may be embodied by any number of software or hardware forms. For example, a component or module may be implemented as a hardware circuit comprising custom circuitry or off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. The executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as the command and control service) may take place on a different processing system (e.g., in a computer in a cloud-hosted data center), than that in which the code is deployed (e.g., in a test computing environment). Similarly, operational data may be included within respective components or modules, and may be embodied in any suitable form and organized within any suitable type of data structure. The operational data may be collected as a single data set, or may be distributed over different locations including over different storage devices.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:
1. A computing system, comprising:
a processor; and
a memory device including instructions embodied thereon, wherein the instructions, when executed by the processor, configure the processor to perform operations that present event search results in a user interface for a calendar of events, with operations to:

generate a calendar surface portion of the user interface, wherein the calendar surface portion displays events from the calendar of events and is in a calendar format;
receive a search query for a search of the calendar of events;
search the calendar of events with text that match a string of the search query;
generate a search result based on the search, the search result comprising two or more events from the calendar of events;
cause a display of the search result as a listing in a list surface portion of the user interface;
select a first chronological event from the listing in the list surface portion as a selected event; and
render the calendar surface portion of the user interface to display a time period which includes the selected event, wherein the selected event is displayed in the calendar surface portion based on a match with the first chronological event displayed in the list surface portion;
wherein the display of the selected event in the list surface portion and the display of the selected event in the calendar surface portion have corresponding graphical indicators based on the match with the search query.

2. The computing system of claim 1, the operations further to:
in response to user interaction with the calendar surface portion of the user interface, render the search result portion of the user interface to change the display of the at least one event from the search result; and
in response to user interaction with the search result portion of the user interface, render the calendar surface portion of the user interface to change the display of the at least one event in the view of the calendar.

3. The computing system of claim 1, the operations further to:
render the search result portion based on the corresponding event that is being displayed within the calendar surface portion;
wherein the search result portion is further configured to apply a graphical emphasis effect to at least one event from the search result that is visible in the calendar surface portion, and to apply a graphical de-emphasis effect to at least one event from the search result that is not visible in the calendar surface portion;
wherein the graphical emphasis effect is provided from at least one of: highlighting, an opacity setting, an increased font size, a first designated pattern, or a first designated color; and
wherein the graphical de-emphasis effect is provided from at least one of: a shading, a translucent setting, a decreased font size, a second designated pattern, a second designated color, or a hiding of the at least one event.

4. The computing system of claim 1, wherein the view of the calendar is a calendar grid customizable from among a plurality of available calendar grids, the plurality of available calendar grids including: a monthly, a weekly, or a daily view.

5. The computing system of claim 4, wherein the render of the calendar surface portion includes a graphical emphasis effect applied to the display of the at least one event in the calendar grid, and wherein the graphical emphasis effect is provided from at least one of: highlighting, an opacity setting, an increased font size, a first designated pattern, or a first designated color.

6. The computing system of claim 4, wherein the render of the calendar surface portion includes a graphical de-emphasis effect applied to the display of the at least one event in the calendar grid, and wherein the graphical de-emphasis effect is provided from at least one of: a shading, a translucent setting, a decreased font size, a second designated pattern, or a second designated color.

7. The computing system of claim 4, wherein the render of the calendar surface portion includes hiding of at least one calendar entry in the calendar grid, and wherein the hiding is performed for the at least one calendar entry that does not correspond to the search result.

8. The computing system of claim 1, wherein the search query is initiated from an alphanumeric text query received in a search input box, the search input box being visible in addition to the search result portion of the calendar interface; and
wherein the search result portion and the calendar surface portion presents at least one highlighted keyword from the alphanumeric text query, the highlighted keywords being presented in the search result portion and the calendar surface portion in response to receipt of the alphanumeric text query in the search input box.

9. The computing system of claim 1, wherein the user interface is provided in a graphical user interface of: a messaging software application, a web application of a browser application, a project management application, or a standalone calendar management software application.

10. The computing system of claim 1, the operations further to:
determine a customized time range for the search query, based on at least one of: a type of event indicated in the search result, a total number of results indicated in the search result, or a user preference for searching prior events.

11. The computing system of claim 1, the operations further to:
generate the search query in a search portion of the user interface, based on at least one of: a historical search query, an auto-suggested search criteria, or an auto-completed search keyword or phrase.

12. A method, comprising a plurality of operations executed with a processor and memory of a computing system, for presenting event search results in a user interface for a calendar of events, with the plurality of operations including:
generating a calendar surface portion of the user interface, wherein the calendar surface portion displays events from the calendar of events and is in a calendar format;
receiving a search query for a search of the calendar of events;
searching the calendar of events with text that match a string of the search query;
generate a search result based on the search, the search result comprising two or more events from the calendar of events;
cause a display of the search result as a listing in a list surface portion of the user interface;
selecting a first chronological event from the listing in the list surface portion as a selected event; and
rendering the calendar surface portion of the user interface to display a time period which includes the selected event, wherein the selected event is displayed in the calendar surface portion based on a match with the first chronological event displayed in the list surface portion;
   wherein the display of the selected event in the list surface portion and the display of the selected event in the calendar surface portion have corresponding graphical indicators based on the match with the search query.

13. The method of claim 12, the plurality of operations further including:
   in response to user interaction with the calendar surface portion of the user interface, rendering the search result portion of the user interface to change the display of the at least one event from the search result; and
   in response to user interaction with the search result portion of the user interface, rendering the calendar surface portion of the user interface to change the display of the at least one event in the view of the calendar.

14. The method of claim 12, the plurality of operations further including:
   rendering the search result portion based on the corresponding event that is being displayed within the calendar surface portion;
   wherein the search result portion is further configured to apply a graphical emphasis effect to at least one event from the search result that is visible in the calendar surface portion, and to apply a graphical de-emphasis effect to at least one event from the search result that is not visible in the calendar surface portion.

15. The method of claim 12,
   wherein rendering the calendar surface portion includes applying a first graphical emphasis effect to the display of the at least one event in the calendar surface portion of the user interface,
   wherein the search result portion is further configured to apply a second graphical emphasis effect to at least one event from the search result that is visible in the calendar surface portion, and
   wherein the first and second graphical emphasis effect is provided from at least one of: highlighting, an opacity setting, an increased font size, a designated pattern, or a designated color.

16. The method of claim 12,
   wherein rendering the calendar surface portion includes applying a first graphical de-emphasis effect to a display of at least one other event in the calendar surface portion of the user interface that does not correspond to the search result,
   wherein the search result portion is further configured to apply a second graphical de-emphasis effect to at least one event from the search result that is not visible in the calendar surface portion, and
   wherein the first and second graphical de-emphasis effect is provided from at least one of: highlighting, an opacity setting, an increased font size, a designated pattern, a designated color, or hiding of the respective event.

17. A non-transitory device-readable storage medium, the device-readable storage medium including instructions for presenting event search results in a user interface for a calendar of events, wherein the instructions, when executed by a processor and memory of a computing system, causes the processor to perform operations to:
   generate a calendar surface portion of the user interface, wherein the calendar surface portion displays events from the calendar of events and is in a calendar format;
   receive a search query for a search of the calendar of events;
   search the calendar of events with text that match a string of the search query;
   generate a search result based on the search, the search result comprising two or more events from the calendar of events;
   cause a display of the search result as a listing in a list surface portion of the user interface;
   select a first chronological event from the listing in the list surface portion as a selected event; and
   render the calendar surface portion of the user interface to display a time period which includes the selected event, wherein the selected event is displayed in the calendar surface portion based on a match with the first chronological event displayed in the list surface portion;
   wherein the display of the selected event in the list surface portion and the display of the selected event in the calendar surface portion have corresponding graphical indicators based on the match with the search query.

18. The device-readable storage medium of claim 17, the operations further to:
   in response to user interaction with the calendar surface portion of the user interface, render the search result portion of the user interface to render the display of the at least one event from the search result; and
   in response to user interaction with the search result portion of the user interface, render the calendar surface portion of the user interface to render the display of the at least one event in the view of the calendar.

19. The device-readable storage medium of claim 17, the operations further to:
   render the search result portion based on the corresponding event that is being displayed within the calendar surface portion;
   wherein the search result portion is further configured to apply a graphical emphasis effect to at least one event from the search result that is visible in the calendar surface portion, and to apply a graphical de-emphasis effect to at least one event from the search result that is not visible in the calendar surface portion.

20. The device-readable storage medium of claim 17,
   wherein the render of the calendar surface portion includes a first graphical emphasis effect applied to the display of the at least one event in the calendar surface portion of the user interface,
   wherein the search result portion is further configured to apply a second graphical emphasis effect to at least one event from the search result that is visible in the calendar surface portion, and
   wherein the first and second graphical emphasis effect is provided from at least one of: highlighting, an opacity setting, an increased font size, a designated pattern, or a designated color.

21. The device-readable storage medium of claim 17,
   wherein the render of the calendar surface portion includes a first graphical de-emphasis effect applied to a display of at least one other event in the calendar surface portion of the user interface that does not correspond to the search result,
   wherein the search result portion is further configured to apply a second graphical de-emphasis effect to at least one event from the search result that is not visible in the calendar surface portion, and
   wherein the first and second graphical de-emphasis effect is provided from at least one of: highlighting, an opacity setting, an increased font size, a designated pattern, a designated color, or hiding of the respective event.

* * * * *